(12) United States Patent
Tariq et al.

(10) Patent No.: US 8,300,605 B2
(45) Date of Patent: *Oct. 30, 2012

(54) GENERAL ACCESS NETWORK CONTROLLER BYPASS TO FACILITATE USE OF STANDARD CELLULAR HANDSETS WITH A GENERAL ACCESS NETWORK

(75) Inventors: Ahmed Tariq, Port Coquitlam (CA);
Elliott Hoole, Sammamish, WA (US);
Jayesh Sukumaran, Woodinville, WA (US); Yan Zhang, Bellevue, WA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/053,889

(22) Filed: Mar. 22, 2011

(65) Prior Publication Data

US 2011/0171956 A1 Jul. 14, 2011

Related U.S. Application Data

(63) Continuation of application No. 11/582,124, filed on Oct. 16, 2006, now Pat. No. 7,944,885.

(60) Provisional application No. 60/772,256, filed on Feb. 11, 2006.

(51) Int. Cl.
*H04W 4/00* (2009.01)
*H04W 36/00* (2009.01)
*H04M 1/00* (2006.01)
*H04L 12/66* (2006.01)

(52) U.S. Cl. ............... 370/331; 455/436; 455/552.1; 370/352

(58) Field of Classification Search ........... 370/331; 455/436, 552.1
See application file for complete search history.

(56) References Cited

U.S. PATENT DOCUMENTS

| 5,898,679 | A | 4/1999 | Brederveld et al. |
| 6,487,602 | B1 | 11/2002 | Thakker |
| 7,266,393 | B2 | 9/2007 | Latva-Aho et al. |
| 7,389,110 | B2 * | 6/2008 | Lee .............................. 455/436 |
| 7,424,313 | B2 | 9/2008 | Ham et al. |
| 7,454,210 | B2 | 11/2008 | Rinne et al. |
| 7,688,820 | B2 | 3/2010 | Forte et al. |
| 2002/0012433 | A1 | 1/2002 | Haverinen et al. |
| 2002/0110104 | A1 | 8/2002 | Surdila et al. |

(Continued)

FOREIGN PATENT DOCUMENTS

EP 1 231 808 8/2002

(Continued)

OTHER PUBLICATIONS

Communication with Supplementary European Search Report corresponding to EP Application No. EP 06848060.7, 8 pages, mailed Dec. 21, 2010.

(Continued)

*Primary Examiner* — Rafael Pérez-Gutiérrez
*Assistant Examiner* — Allahyar Kasraian
(74) *Attorney, Agent, or Firm* — Sterne, Kessler, Goldstein & Fox PLLC

(57) ABSTRACT

Enabling a standard cellular handset to be used to access a core mobile network via a generic access network is disclosed. A communication between a generic access network element and the core mobile network is intercepted. A modified version of the communication is generated. The modified communication is forwarded.

20 Claims, 17 Drawing Sheets

U.S. PATENT DOCUMENTS

| | | |
|---|---|---|
| 2002/0126656 A1 | 9/2002 | Park |
| 2002/0131387 A1 | 9/2002 | Pitcher et al. |
| 2003/0064725 A1 | 4/2003 | Niska |
| 2003/0193905 A1 | 10/2003 | Mahany et al. |
| 2004/0121770 A1 | 6/2004 | Tigerstedt et al. |
| 2004/0186376 A1 | 9/2004 | Hogg et al. |
| 2006/0025141 A1 | 2/2006 | Marsh et al. |
| 2006/0045069 A1 | 3/2006 | Zehavi et al. |
| 2006/0083199 A1 | 4/2006 | Yang |
| 2006/0098627 A1 | 5/2006 | Karaoguz et al. |
| 2006/0116125 A1 | 6/2006 | Buckley et al. |
| 2006/0172722 A1 | 8/2006 | Christensen et al. |
| 2006/0262778 A1 | 11/2006 | Haumont et al. |
| 2006/0276137 A1 | 12/2006 | Pummill et al. |
| 2006/0291455 A1 | 12/2006 | Katz et al. |
| 2007/0014281 A1 | 1/2007 | Kant |
| 2007/0041360 A1 | 2/2007 | Gallagher et al. |
| 2007/0083470 A1 | 4/2007 | Bonner et al. |
| 2007/0121596 A1 | 5/2007 | Kurapati et al. |
| 2007/0188298 A1 | 8/2007 | Tariq et al. |
| 2007/0189254 A1 | 8/2007 | Tariq et al. |
| 2007/0191001 A1 | 8/2007 | Tariq et al. |
| 2007/0191014 A1 | 8/2007 | Zheng et al. |
| 2007/0243872 A1 | 10/2007 | Gallagher et al. |
| 2008/0119165 A1 | 5/2008 | Mittal et al. |
| 2011/0249617 A1* | 10/2011 | Desorbay et al. ............ 370/328 |

FOREIGN PATENT DOCUMENTS

| | | |
|---|---|---|
| EP | 1 465 442 | 6/2004 |
| WO | WO 01/03449 | 1/2001 |
| WO | WO 02/056618 | 7/2002 |
| WO | WO 02/080586 | 10/2002 |
| WO | WO 02/080605 | 10/2002 |
| WO | WO 02/085060 | 10/2002 |
| WO | WO 03/017704 | 2/2003 |
| WO | WO 2004/008720 | 1/2004 |
| WO | WO 2005/076648 | 8/2005 |
| WO | WO 2005/114911 A1 | 12/2005 |
| WO | WO 2005/114920 A | 12/2005 |
| WO | WO 2005/119978 | 12/2005 |
| WO | WO 2006/002676 A | 1/2006 |

OTHER PUBLICATIONS

Digital cellular telecommunications system (Phase 2+); Generic access to the A/Gb interface; Stage 2 (3GPP TS 43.318 version 6.4.0 Release 6); ETSI TS 143318,69 pages, Nov. 2005.

3rd Generation partnership project; Technical Specification Group Core Network; 3GPP System to Wireless Local Area Network (WLAN) interworking; User Equipment (UE) to network protocols; Stage 3 (Release 6); 3GPP TS 24.234 v6.0.0, 24 pages, Sep. 2004.

* cited by examiner

GENERAL ACCESS NETWORK CONTROLLER BYPASS TO FACILITATE USE OF STANDARD CELLULAR HANDSETS WITH A GENERAL ACCESS NETWORK

CROSS-REFERENCE TO RELATED APPLICATIONS/INCORPORATION BY REFERENCE

The present application is a CONTINUATION of U.S. application Ser. No. 11/582,124, filed Oct. 16, 2011. Said U.S. application Ser. No. 11/582,124 claims benefit from and priority to U.S. Application No. 60/772,256, filed Feb. 11, 2006. The above-identified applications are hereby incorporated herein by reference in their entirety.

BACKGROUND OF THE INVENTION

Traditional 2G and 2.5G cellular infrastructure using standard licensed cellular protocol handsets ("Standard Mobile Stations" or "MS") requires use of a base transceiver station (BTS) and a base station controller (BSC) also using that cellular protocol. The Standard Mobile Stations communicate with the cellular infrastructure over a cellular air interface such as Um (for GSM and CDMA2000) or Uu (for UMTS). The traditional 2G and 2.5G cellular infrastructures are relatively costly to deploy due to particulars of the technology and because of the relatively few number of subscribers which can be supported in a given cellular infrastructure deployment.

A Generic Access Network (GAN) is generally less expensive and easier to deploy when compared to traditional 2G and 2.5G cellular infrastructures. Using a GAN however, a dual mode handset is generally required in order to communicate with the cellular infrastructure through an Access Point (AP) and a Generic Access Network Controller (GANC), using an Up interface. The requirement of a dual mode phone forces subscribers to obtain new cellular phones, which include the additional expense and complexity of a dual mode transceiver. It would be desirable to enable the benefits of a GAN to be realized in a cellular infrastructure such that only the use of a Standard Mobile Station is required.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Use of a Standard Mobile Station (MS) to place and/or receive mobile calls via a general access network (GAN) is disclosed. In some embodiments, MS interoperability with the GANC and rest of the mobile core network using an Up interface is disclosed. As a result, there is no requirement for a different handset such as a dual-mode WLAN/cellular handset to be used to access a GAN. This allows extension of the access network more economically, since a GAN is less expensive to build out than traditional BSC-based access network infrastructure. In some embodiments, some of the radio resource management functions traditionally performed by a BSC are incorporated into an Aggregation Gateway (AGW) and/or a micro-BTS used to provide access to the GAN at least in part via IP network (private or other) backhaul of data from the micro-BTS to the AGW. The approaches disclosed herein may be used, in general, to enable a traditional cellular air interface to interoperate with a "Up" or other general access network interface. In some embodiments, a cellular air interface, such as the Um or Uu interface, is translated to an Up interface. This allows registration procedures of the GAN, signaling function translation, voice packet translation, handover, and access control.

Figure 1:
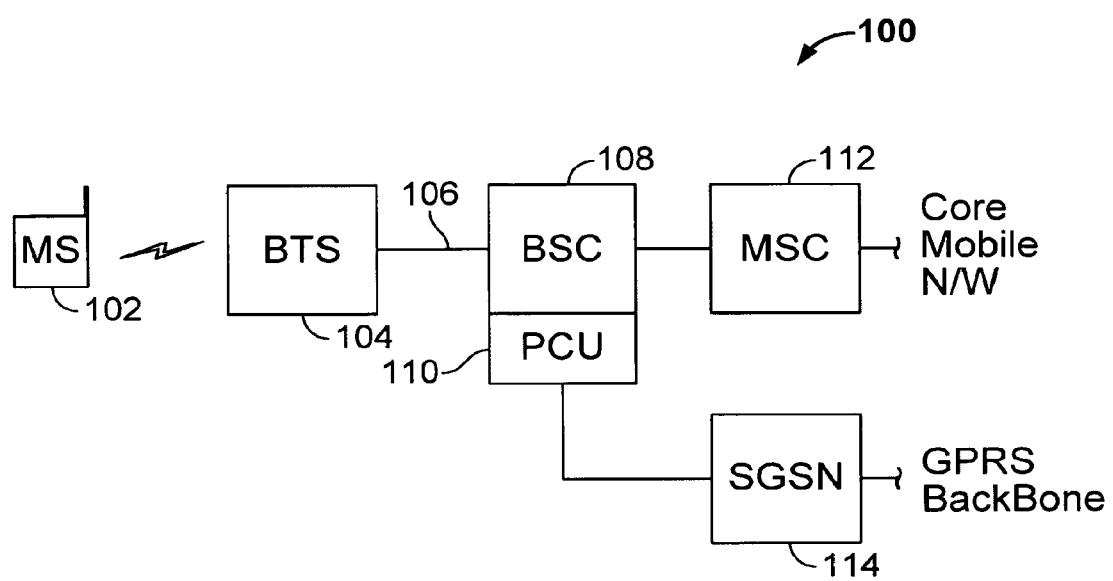
FIG. 1 is a block diagram illustrating an embodiment of a prior art GSM EDGE (enhanced data rate for GSM evolution) radio access network (GERAN).

FIG. 1 is a block diagram illustrating an embodiment of a prior art GSM EDGE (enhanced data rate for GSM evolution) radio access network (GERAN). In GERAN 100, a mobile station (MS) 102 communicates with a base transceiver station (BTS) 104 via an air link. The BTS 104 is connected via an Abis interface 106, carried for example over a T1 or other private line, to a base station controller (BSC) 108. BSC 108 has associated with it a packet control unit (PCU) 110 used to communicate non-voice data packets to/from the MS 102. BSC 108 sends voice data from MS 102 to the core mobile network, and receives voice data from the core mobile network to MS 102, via an A interface connection to a mobile switching center (MSC) 112. Packetized (typically non-voice) data is sent to/from MS 102 via a connection between PCU 110 and a serving GPRS support node (SGSN) 114.

Figure 2:
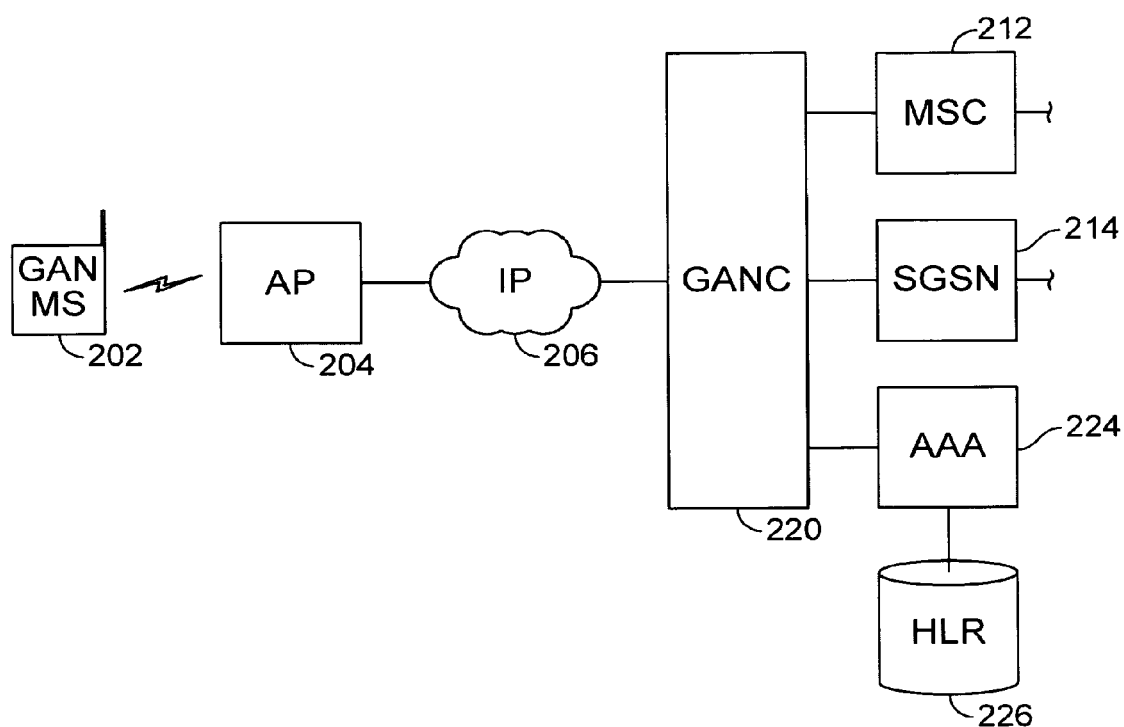
FIG. 2 is a block diagram illustrating an embodiment of a prior art generic access network (GAN).

FIG. 2 is a block diagram illustrating an embodiment of a prior art generic access network (GAN). A GAN-enable mobile station 202 communicates via an air link with a wireless access point (AP) 204. AP 204 is connected via an IP network (public, private, and/or combined public/private) 206 to a generic access network controller (GANC) 220. GANC 220 is configured to authenticate GAN MS 202 using standard core mobile network authentication facilities via a connection to an authentication, authorization, and accounting (AAA) server/proxy 224. AAA server/proxy 224 accesses an HLR (home location register) database 226 to authenticate the GAN MS 202. GANC 220 routes voice traffic from GAN-enable MS 202 to the core mobile network, and receives voice traffic to MS 202 from the core mobile network, via an A interface to MSC 212. Non-voice data traffic is routed via a Gb interface connection to SGSN 214.

Figure 3:
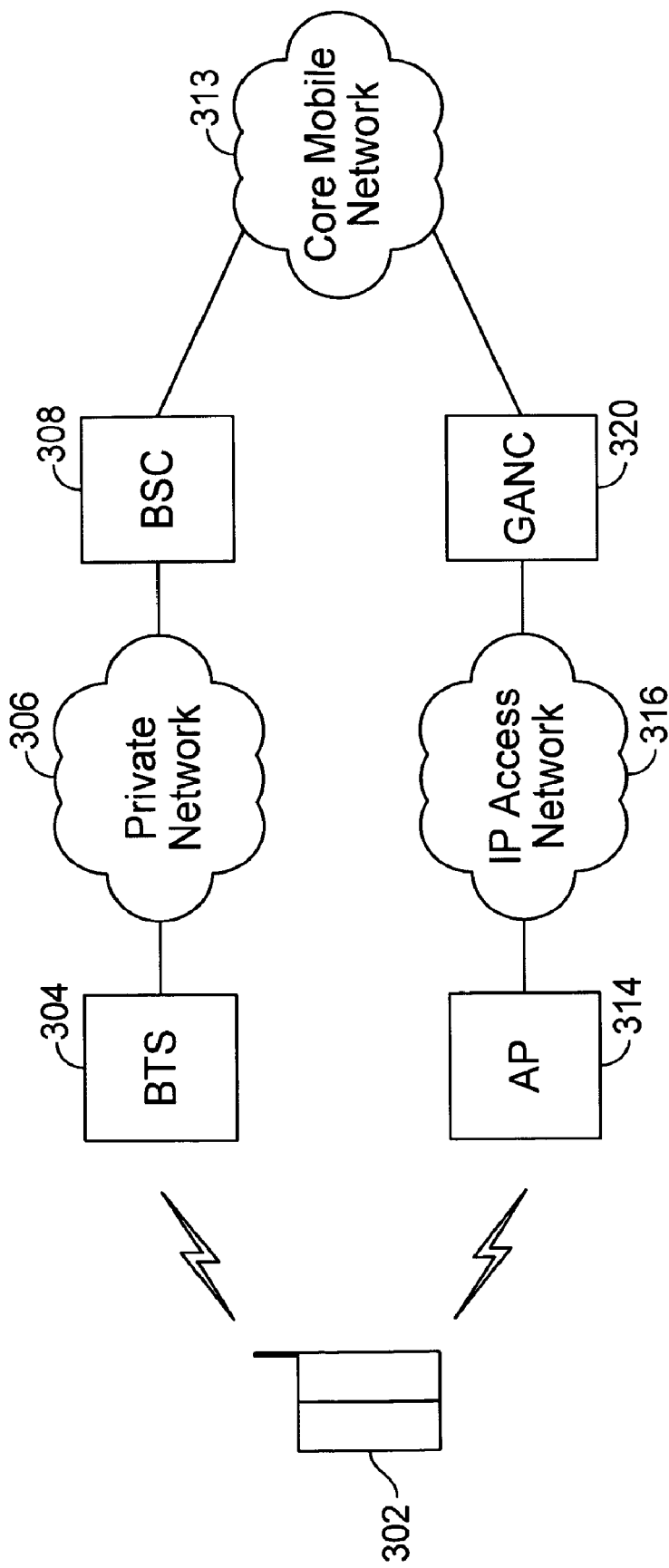
FIG. 3 is a block diagram illustrating an embodiment of a prior art approach to providing mobile phone service via both a GERAN and GAN.

FIG. 3 is a block diagram illustrating an embodiment of a prior art approach to providing mobile phone service via both a GERAN and GAN. A dual-mode mobile station 302 is configured to communicate in a first mode with GERAN elements via a first air interface (e.g., a Um interface) to a BTS 304. Connectivity to the core mobile network 313 is provided via an Abis interface carried over a private network connection 306 (e.g., dedicated T1) to a BSC 308 having an A interface to the core mobile network 313, e.g., via an MSC (not shown). In a second mode, dual-mode MS 302 communicates via a second air interface (e.g., WiFi or other unlicensed) to an access point 314, which access point is connected via an IP access network 316 to a generic access network controller (GANC) 320, which has a connection to the core mobile network 313, e.g., via an MSC (not shown). In a GAN, the interface between mobile station 302 and GANC 320 via AP 314 and IP access network 316 comprises a Up interface.

In the approach shown in FIG. 3, a mobile station specially configured to communicate in a first mode via the standard mobile network (e.g., GSM) elements and in a second mode via general access network elements (e.g., via a Up interface to a GANC) is required to take advantage of the flexibility and the ease and relatively low cost of deployment of GAN access components.

IP backhaul of mobile call data has been disclosed. An example of such a system is described in U.S. Provisional Patent Application No. 60/765,260 entitled MOBILE NETWORK WITH PACKET DATA NETWORK BACKHAUL, filed Feb. 3, 2006, which is incorporated herein by reference for all purposes.

Figure 4:
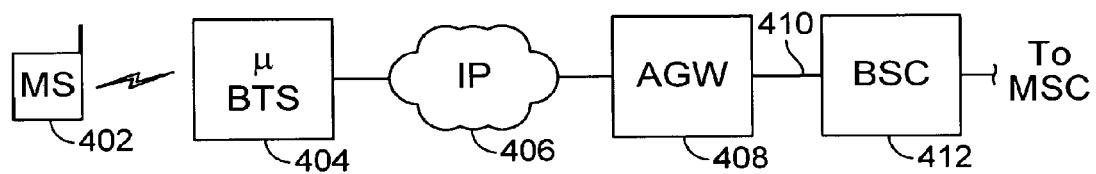
FIG. 4 is a block diagram illustrating an embodiment of a system for IP backhaul of mobile call data.

FIG. 4 is a block diagram illustrating an embodiment of a system for IP backhaul of mobile call data. An MS 402 communicates with a micro-BTS 404 via an air (e.g., Urn) interface. In some embodiments, micro-BTS 404 comprises a radio system of very small form factor relative to a traditional BTS and in some embodiments is of a size suitable for being mounted on a wall or to a ceiling, such as a typical WiFi access point. BTS 404 communicates via an IP network 406 with an aggregating gateway 408. Call data from MS 402 is encapsulated and sent to AGW 408 via IP network 406 using, for example, the real-time protocol (RTP) or other protocol suitable for communicating voice data via an IP and/or other packet data network. AGW 408 extracts call data from packets received from BTS 404 and forwards them to the core mobile network via an Abis connection 410 to a BSC 412. In some embodiments, BSC 412 comprises a BSC provided by a third party OEM and the Abis interface 410 conforms to an API that is at least partially proprietary to the third party OEM. AGW 408 encapsulates call data received from the core mobile network via Abis interface 410 to BSC 412, and transports the call data to micro-BTS 404 via IP network 406. BTS 404 extracts the call data and sends it to MS 402 via the standard Um interface.

Figure 5:
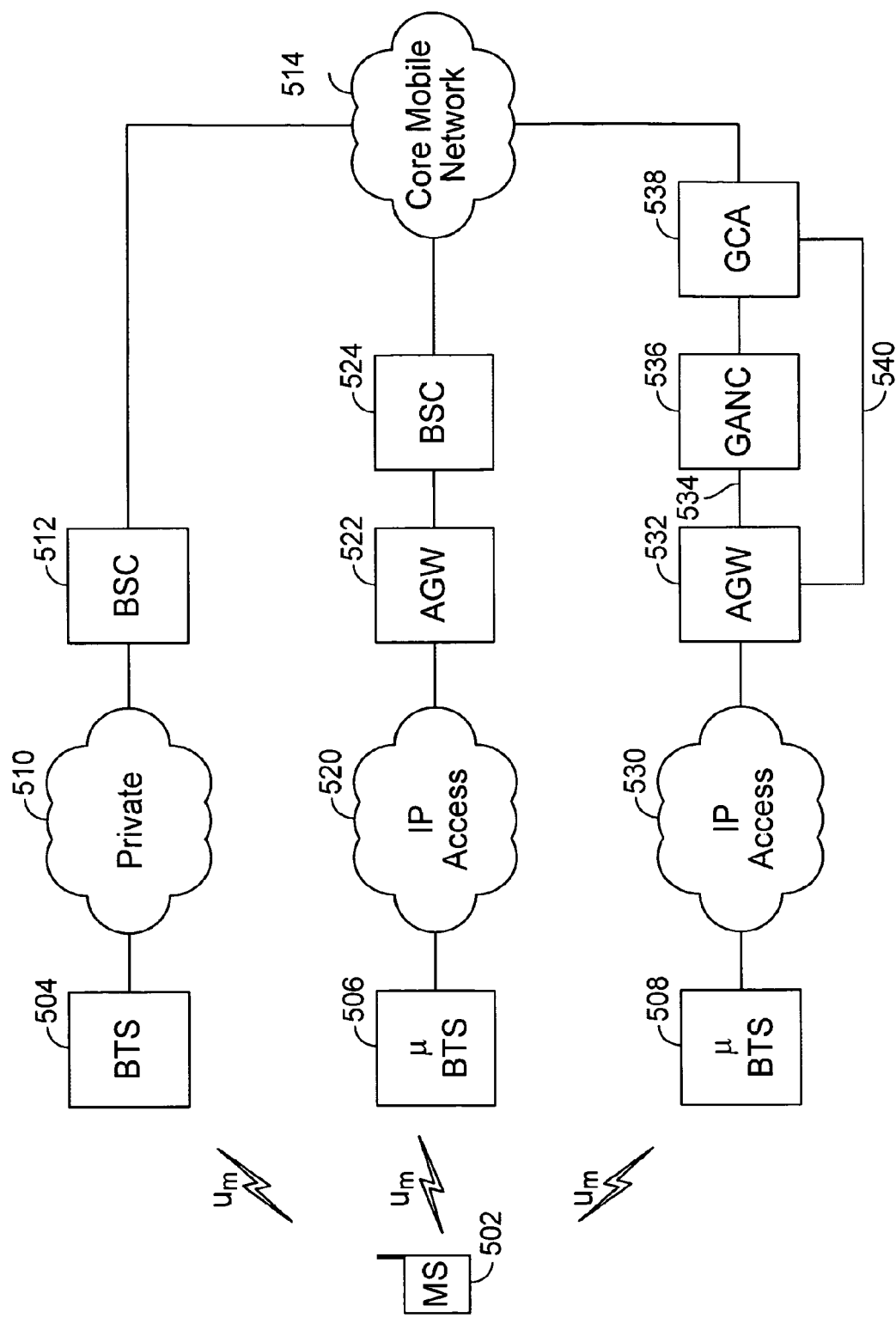
FIG. 5 is a block diagram illustrating an embodiment of a system for enabling a standard cellular handset to be used to access a core mobile network via a generic access network.

FIG. 5 is a block diagram illustrating an embodiment of a system for enabling a standard cellular handset to be used to access a core mobile network via a generic access network. In the example shown, a standard cellular handset (MS) 502 communicates via a single air interface (e.g., the GSM Um interface) with either a conventional BTS 504 or a micro-BTS such as BTS 506 and BTS 508. Which BTS the MS 502 communicates with is determined in the same manner as in the GERAN generally, e.g., based on reported and/or inferred signal strength and/or link quality information. In the example shown, conventional BTS 504 is connected to the core mobile network 514 via a private network 510 (e.g., a T1 line) to BSC 512. Micro-BTS 506 is connected to core mobile network 514 via an IP access network 520, an AGW 522, and a BSC 524, in the same manner as described above in connection with FIG. 4. In some embodiments, depending on such factors as geography, ownership, provider network topography, etc., a conventional BTS such as BTS 504 and a micro-BTS such as BTS 506 may access the core mobile network via a common BSC (not shown). Finally, micro-BTS 508 is connected to the core mobile network via an IP network 530 and AGW 532. AGW 532 is configured to communicate on behalf of the MS 502 via a Up interface 534 to GANC 536. GANC 536 in this example is connected to the core mobile network 514 via a GANC adjunct (GCA) 538. In various embodiments, GCA 538 monitors and/or modifies communications between GANC 536 and the core mobile network, as described more fully below. In the example shown, GCA 538 and AGW 532 are configured to communicate at least certain information directly via a bypass interface 540. In some embodiments, the GCA facilitates handover by providing via bypass interface 540 data required by AGW 532 to establish on behalf of the MS a secure tunnel to the GANC. In some embodiments, the GCA facilitates establishment of a secure air link between the MS and the BTS by using bypass interface 540 to bypass the GANC, which otherwise would ignore the ciphering communications sent between the core mobile network to the MS, since the GANC assumes the secure Up interface is being used between the MS and the GANC.

Figure 6:
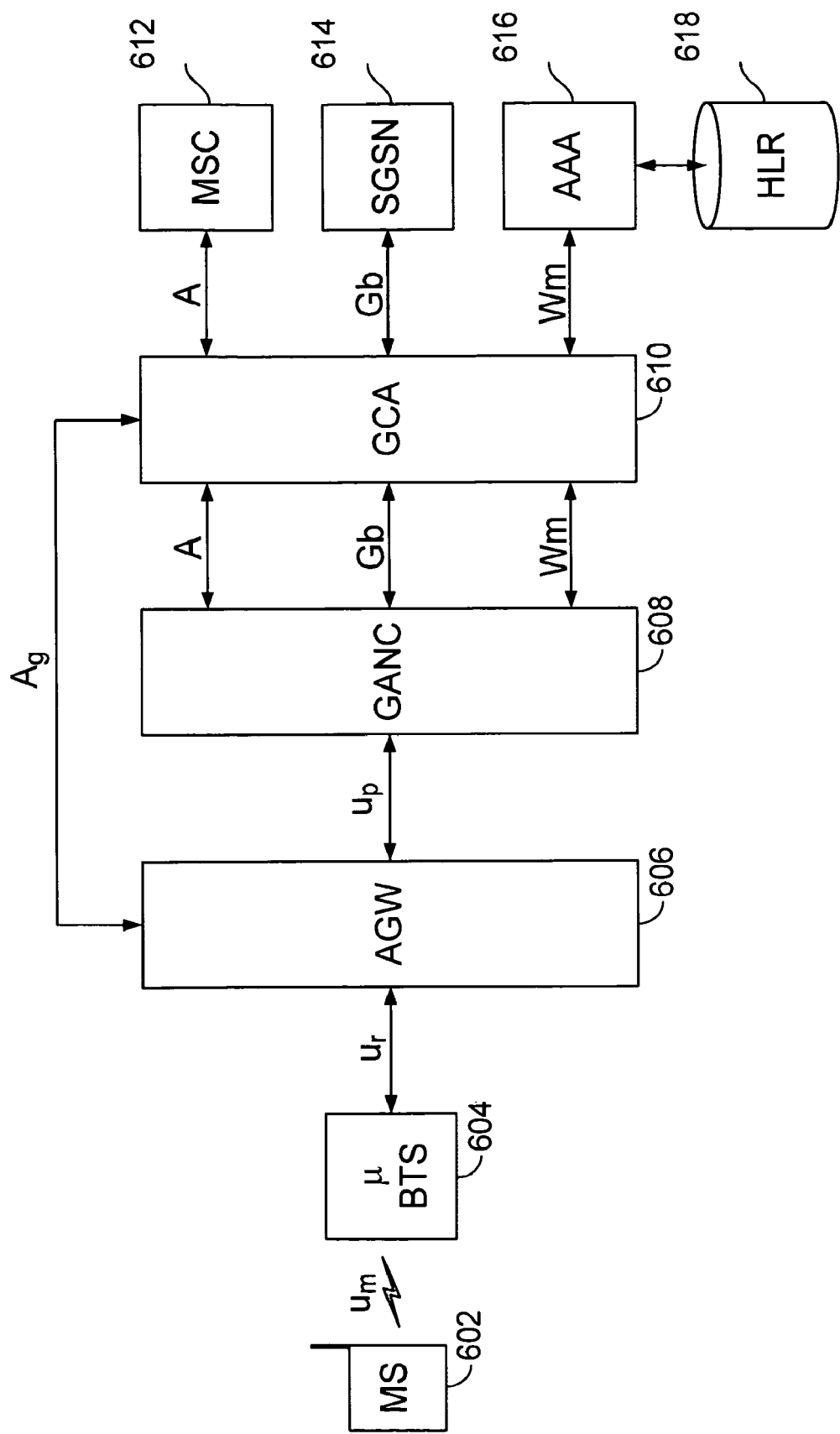
FIG. 6 is a block diagram illustrating an embodiment of a system for enabling a standard cellular handset to be used to access a core mobile network via a generic access network.

FIG. 6 is a block diagram illustrating an embodiment of a system for enabling a standard cellular handset to be used to access a core mobile network via a generic access network. FIG. 6 provides a detailed view of elements 530-540 of FIG. 5 as implemented in some embodiments. In the example shown, a standard GSM mobile station (MS) 602 communicates with a micro-BTS 604 via an air link (Urn interface). BTS 604 communicates with AGW 606 over an IP network, via a proprietary interface designated "Ur" in the example shown. AGW 606 communicates with GANC 608, on behalf of each of MS 602 and any other MS being serviced at any given time by AGW 606, via the GAN "Up" interface. GANC 608 is connected to the core mobile network via GANC adjunct (GCA) 610. GANC 608 communicates voice call data via an "A" interface to MSC 612; communicates packet data via a "Gb" interface to SGSN 614; and performs authentication procedures via a "Wm" interface to AAA server/proxy 616 connected to HLR 618. GCA 610 and AGW 606 are configured to communicate at least certain information directly, as opposed to via GANC 608, via a proprietary bypass connection, designated in the example shown in FIG. 6 as the "Ag" interface.

Figure 7:
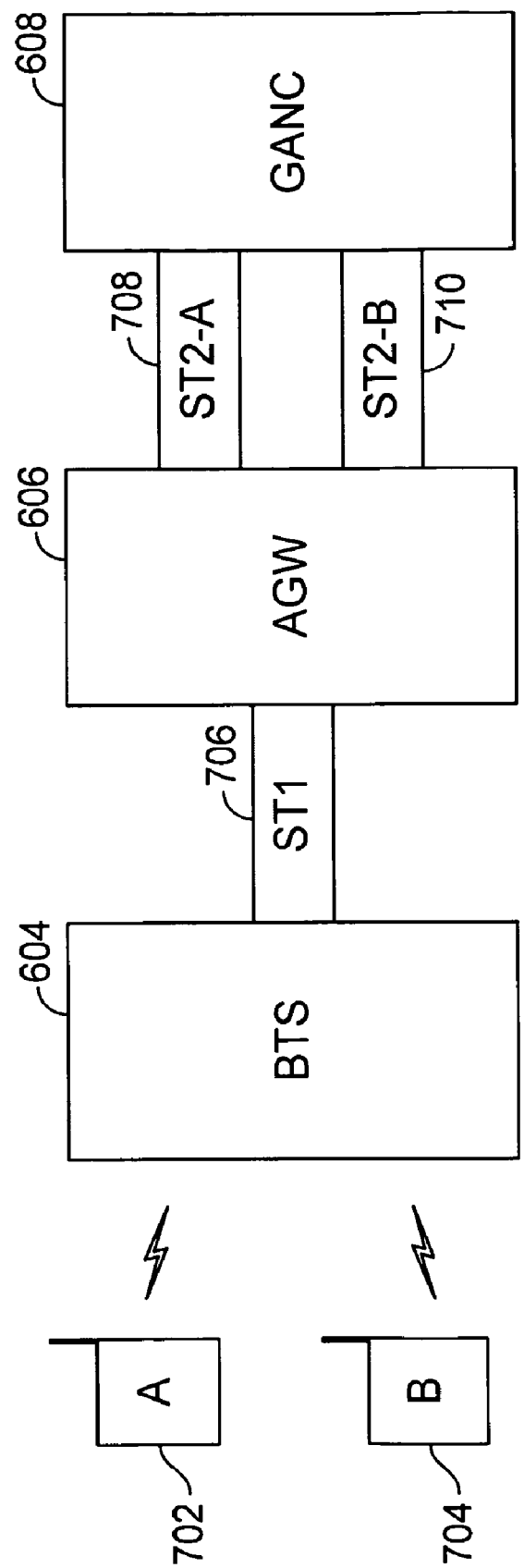
FIG. 7 is a block diagram illustrating an embodiment of portions of a system for enabling a standard cellular handset to be used to access a core mobile network via a generic access network.

FIG. 7 is a block diagram illustrating an embodiment of portions of a system for enabling a standard cellular handset to be used to access a core mobile network via a generic access network. In the example shown, standard cellular handsets A (702) and B (704) communicate with BTS 604 via an air link (e.g., Um interface). BTS 604 communicates with AGW 606 over an IP network via a secure connection (e.g. an "IPsec" or other "tunnel") 706. For normal GAN access to a mobile network, e.g., using a dual mode phone as described above in connection with FIG. 3, GANC 608 is configured and expects to communicate with each MS via a respective secure connection (tunnel) established between the GANC and that MS. Therefore, for each MS, a GANC such as GANC 608 expects the Up interface to be provided via a separate security tunnel between the MS and the GANC. In the example shown, call data for both handset A and handset B is carried between BTS 604 and AGW 606 via a single security tunnel 706 between them. AGW 606 is configured in the example shown to establish for each MS having an active connection to the mobile network via GANC 608 a separate security tunnel between the AGW and the GANC. In the example shown, a first tunnel 708 between AGW 606 and GANC 608 has been set up by AGW 606 on behalf of handset A (702), and a second tunnel 710 has been established by AGW 606 on behalf of handset B (704). (The details of how these tunnels are established are described below in connection with FIGS. 10-12.) The AGW 606 subsequently sends call data to GANC 608 via the security tunnel associated with the MS with which the call data is associated.

Figure 8A:
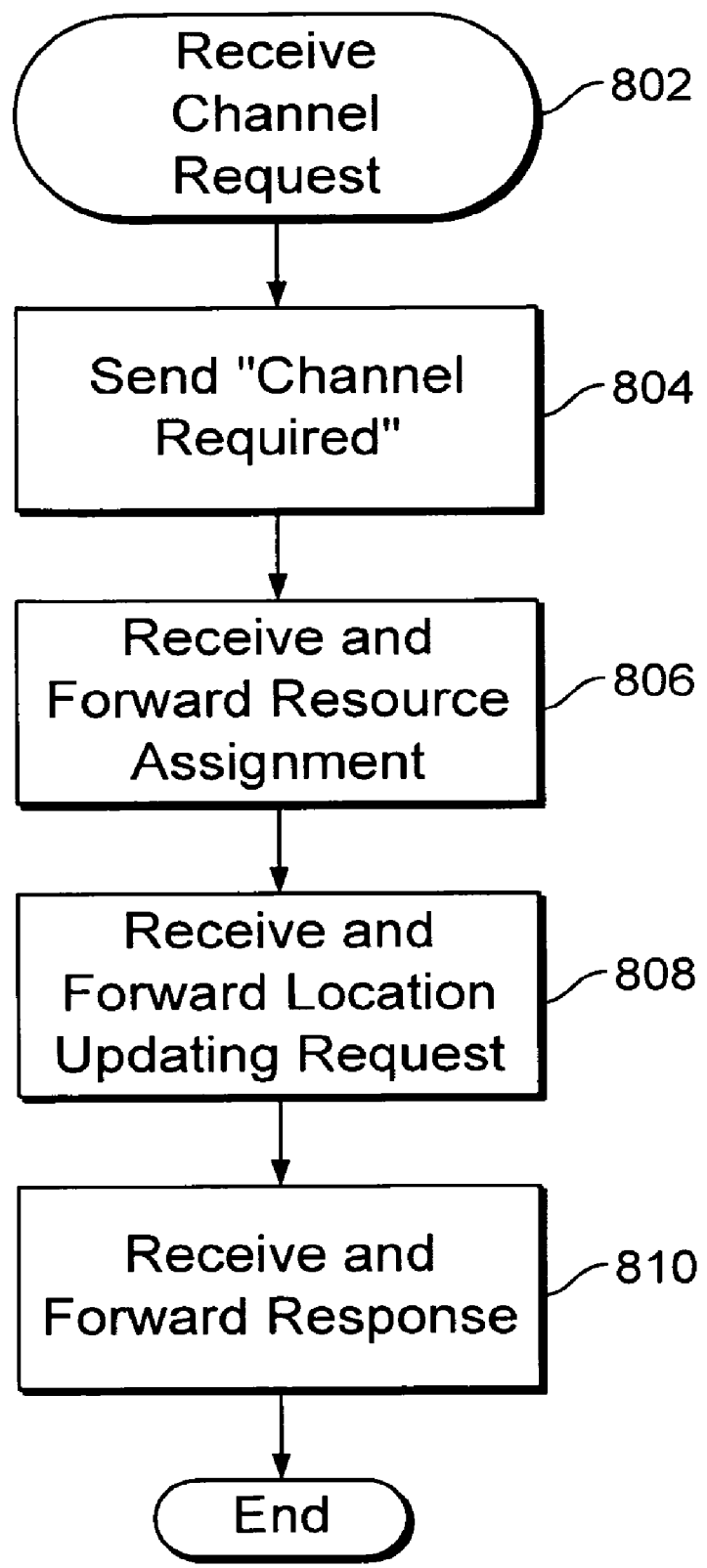
FIG. 8A is a flow chart illustrating an embodiment of a process for establishing a connection to access a core mobile network via a generic access network using a standard cellular handset.

FIG. 8A is a flow chart illustrating an embodiment of a process for establishing a connection to access a core mobile network via a generic access network using a standard cellular handset. In some embodiments, the process of FIG. 8A is implemented by a micro-BTS such as BTS 508 of FIG. 5 or BTS 604 of FIG. 6. In the example shown, a channel request is received from an MS (802). A "channel required" message is sent, e.g., to an AGW such as AGW 532 or AGW 606, indicating the MS has requested a channel (804). Resources assigned to be used by the MS to communicate with the mobile network (e.g., frequency and/or time slot) are received and forwarded to the MS (806). A "location updating" request is received from the MS and forwarded to the mobile network via the AGW (808). A response to the "location updating" request is received via the AGW and forwarded to the MS (810), after which the process of FIG. 8A ends.

Figure 8B:
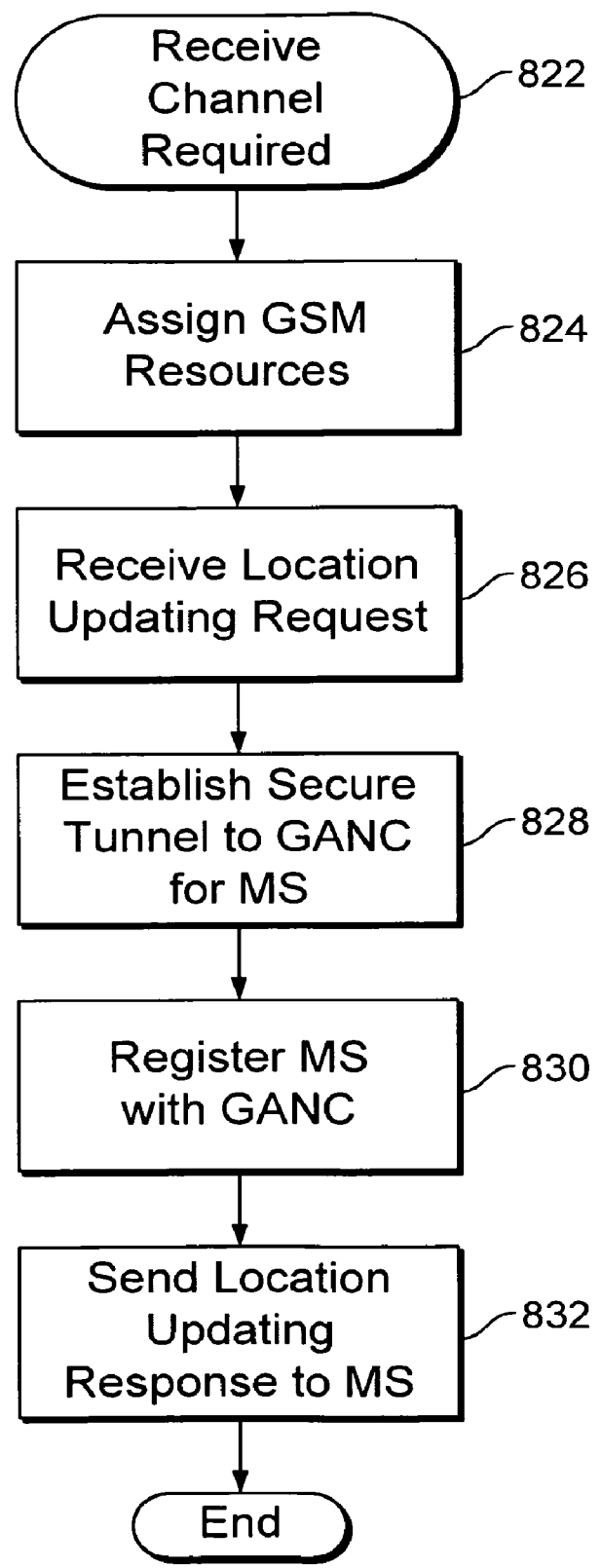
FIG. 8B is a flow chart illustrating an embodiment of a process for establishing a connection to access a core mobile network via a generic access network using a standard cellular handset.

FIG. 8B is a flow chart illustrating an embodiment of a process for establishing a connection to access a core mobile network via a generic access network using a standard cellular handset. In some embodiments, the process of FIG. 8B is implemented by an AGW, such as AGW 532 of FIG. 5 or AGW 606 of FIG. 6. In the example shown, a "channel required" message is received, e.g., from a micro-BTS (822). GSM resources, e.g., frequency and/or time slot, are assigned (824). In some embodiments, the GSM resource assignment, which is done at the BSC in a conventional GERAN, is performed in whole or in part by the AGW. In some embodiments, the GSM resource assignment is performed in whole or in part by the micro-BTS. A "location updating" request is received, e.g., from the MS via the micro-BTS (826). A secure tunnel to the GANC is established on behalf of the MS (828) (see FIGS. 8C-F below). The MS is registered with the GANC (830). In some embodiments, if the registration is accepted by the GANC (as opposed, for example, to being rejected and/or redirected to another GANC), the secure tunnel established for the MS is maintained (i.e., remains available without requirement re-establishment) until the MS is de-registered and/or leaves the service area of the micro-BTS. A response to the "location updating" request is sent to the MS via the micro-BTS (832), after which the process of FIG. 8B ends.

Figure 8C:
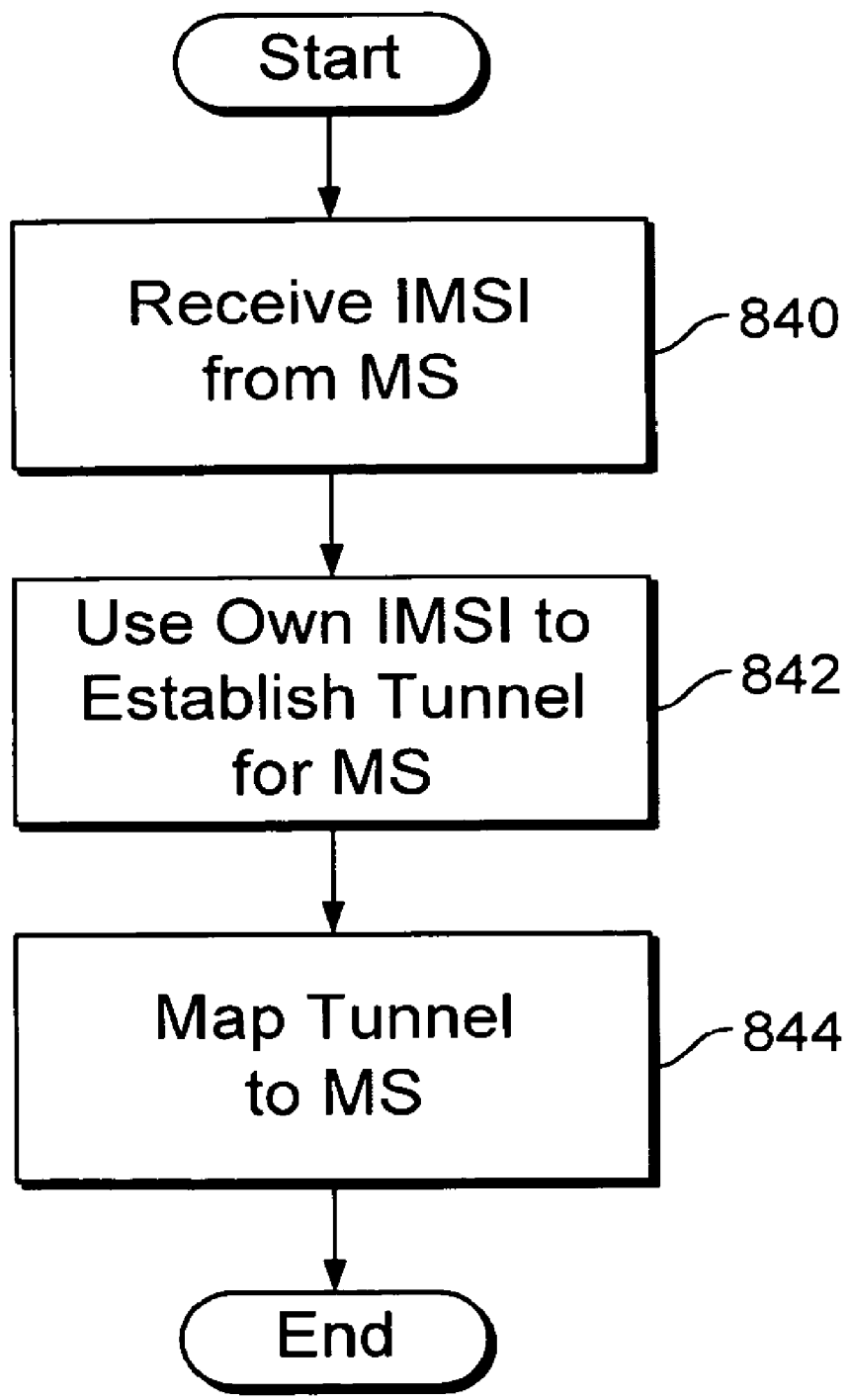
FIG. 8C is a flow chart illustrating an embodiment of a process for establishing a secure tunnel on behalf of an MS.

FIG. 8C is a flow chart illustrating an embodiment of a process for establishing a secure tunnel on behalf of an MS. In some embodiments, 828 of FIG. 8B includes the process of FIG. 8C. The international mobile subscriber identity (IMSI) of the MS is received (or obtained) (840). In some embodiments, the AGW is configured to determine the IMSI of the MS using one or more techniques. Examples of techniques for obtaining the IMSI of a MS include the "Common ID" and "Handover request" messages of BSSMAP; in the case of downlink packet transfer, reading the IMSI from the downlink LLC PDUs received from the SGSN via BSSGP; in case of uplink packet transfer, using the Radio Access Capability Update procedure of BSSGP to request the IMSI of the MS; requesting the IMSI from the MS, directly or indirectly, e.g., by (1) sending an encrypted PROVIDE IDENTITY REQUEST, for IMSI, to the MS, (2) sending a PROVIDE IDENTITY REQUEST, for IMEI, to the MS and using the IMEI to determine the IMSI using a table mapping IMSIs & IMEIs, and (3) sniffing mobility management messages to obtain the TMSI of the MS and using the MAP-G interface with the VLR to obtain the IMSI; and reading the IMSI, if included, from a PROVIDE LOCATION REQUEST message sent from the core network to the BSC/PCU/SMLC. Returning to FIG. 8C, the AGW uses its own IMSI (or in some alternative embodiments, and/or optionally in some embodiments, the IMSI of the BTS) to establish on behalf of the MS a secure tunnel to the GANC (842). In some embodiments, the AGW includes an equipment identification module (EIM) or other smart card, similar to a subscriber identity module (SIM) included in a GSM mobile station to enable the MS to authenticate itself to the mobile network, and includes an IMSI associated uniquely with the AGW, just as a SIM includes an IMSI that uniquely identifies the MS in which the SIM is installed. In some embodiments, the AGW does not have an IMSI and instead uses an IMSI of the micro-BTS, which includes an EIM to enable the BTS to authenticate itself to the AGW and/or mobile network. Referring further to FIG. 8C, the secure tunnel established on behalf to the MS using the AGW's own (or the BTS's) IMSI is mapped at the AGW to the corresponding MS, e.g., to enable call data received from each respective MS to be sent to the GANC via the secure tunnel associated with that MS.

Figure 8D:
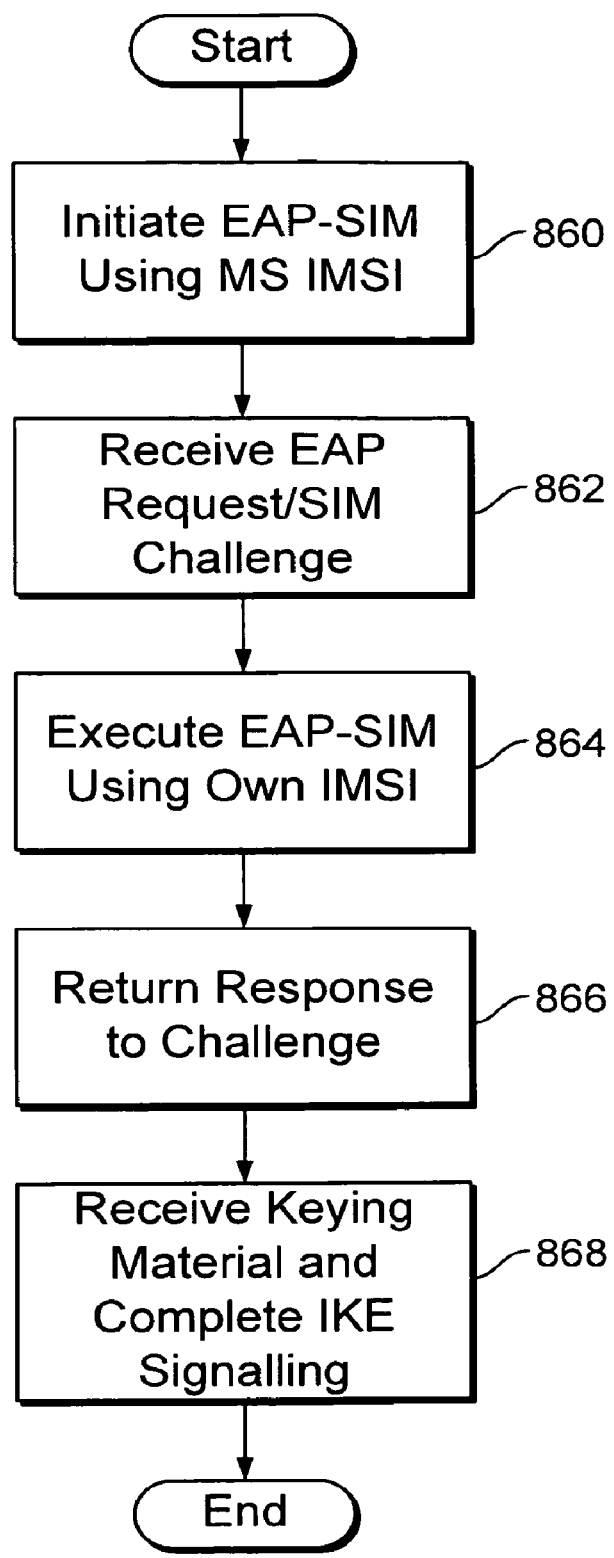
FIG. 8D is a flow chart illustrating an embodiment of a process for using an IMSI other than the IMSI of an MS to establish a secure tunnel to the GANC on behalf of the MS.

FIG. 8D is a flow chart illustrating an embodiment of a process for using an IMSI other than the IMSI of an MS to establish a secure tunnel to the GANC on behalf of the MS. In some embodiments, 842 of FIG. 8C includes the process of FIG. 8D. In some embodiments, the process of FIG. 8D is implemented by an AGW such as AGW 532 of FIG. 5 or AGW 606 of FIG. 6. In the example shown, the EAP-SIM procedure used in the GERAN is used to authenticate the MS to the mobile network, authenticate the provider network elements to the MS, and establish a secure tunnel to the GANC from the AGW on behalf of the MS. The EAP-SIM procedure is initiated, using the IMSI of the MS (860). In some embodiments, initiating the EAP-SIM includes sending an authentication (EAP) request to the GANC using a network access identifier (NAI) associated with the MS and, by extension, the MS's IMSI. In some embodiments, the authentication request subsequently sent by the GANC to the core mobile network (e.g., AAA server/proxy) is intercepted and modified, e.g., as described below in connection with FIG. 8E, to include an NAI (or other applicable identifier) associated with the AGW's (or BTS's) IMSI. An EAP request/SIM challenge is received (862). Due to the NAI translation described above, the EAP request/SIM challenge received at 862 is based on the NAI associated with the AGW (or BTS, in an applicable embodiment), not the MS, with the result that the AGW (or BTS) is able to execute the remaining EAP-SIM procedures using its own EIM or other smart card (864). In various embodiments, 864 includes using a secret data (key) embodiments in the AGW's (or BTS's) EIM to verify a message authentication code (MAC) included in the EAP request/SIM challenge received at 862 and/or to compute a response MAC based on challenge data included in the EAP request/SIM challenge received at 862. A response to the EAP request/SIM challenge is sent (866). Keying material is received and Internet key exchange (IKE) signaling is completed (868), after which the process of FIG. 8D ends.

Figure 8E:
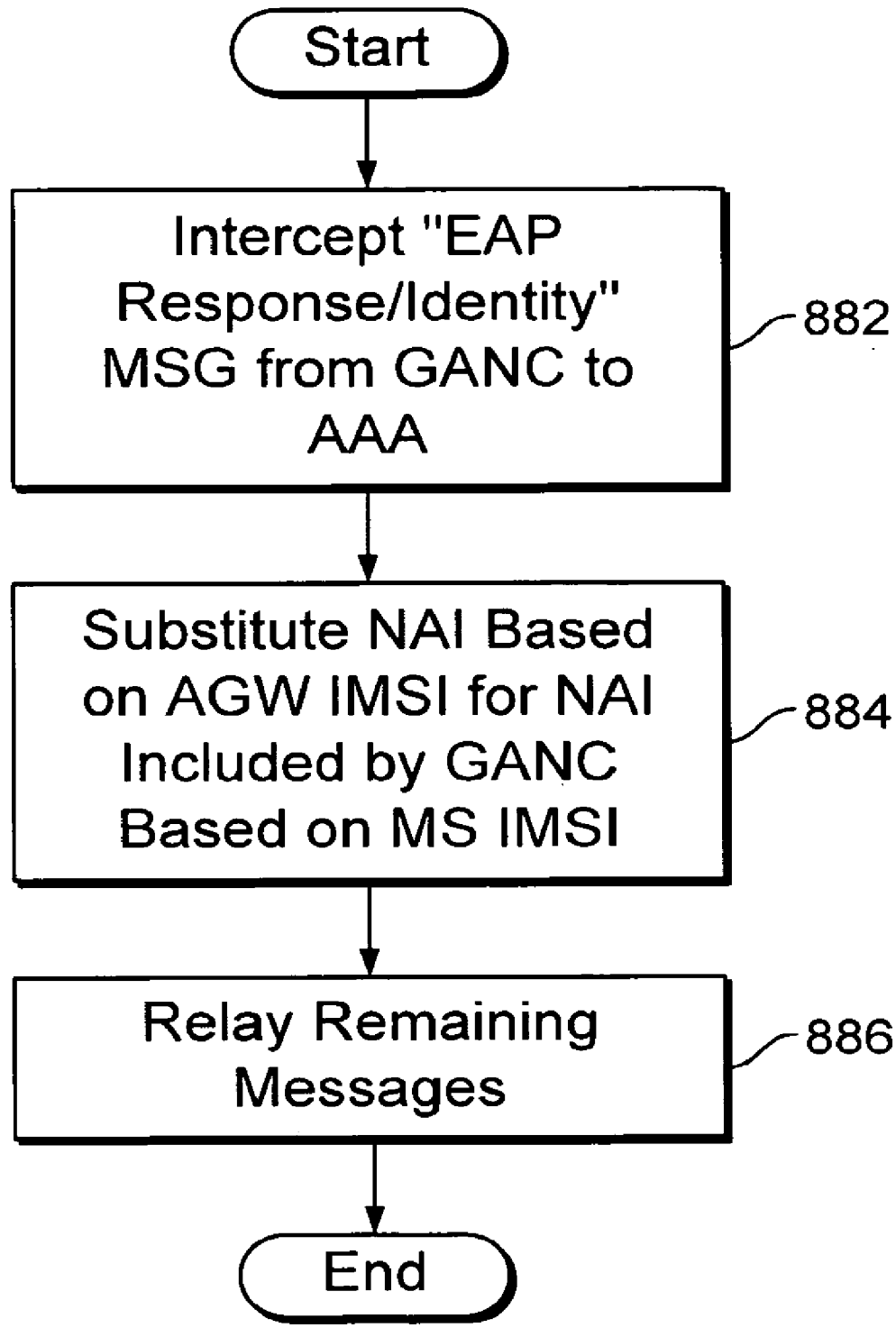
FIG. 8E is a flow chart illustrating an embodiment of a process that facilitates the use of an IMSI other than the IMSI of an MS to establish a secure tunnel to the GANC on behalf of the MS.

FIG. 8E is a flow chart illustrating an embodiment of a process that facilitates the use of an IMSI other than the IMSI of an MS to establish a secure tunnel to the GANC on behalf of the MS. In some embodiments, the process of FIG. 8E is implemented by a GANC adjunct such as GCA 538 of FIG. 5 or GCA 610 of FIG. 6. An EAP response/identity message from the GANC to the AAA server/proxy is intercepted (882). The message is modified to include an NAI associated with the originating AGW (or BTS), instead of an NAI of the MS (884). In some embodiments, the AGW and GCA coordinate the NAI and/or IMSI translation via a direct (bypass) interface between them, such as the Ag interface described above. Remaining EAP-SIM related message associated with the connection are relayed between the GANC and the AAA server/proxy without alteration (886). Due to the original NAI translation, the subsequent messages included data computed based on the secret key of the AGW (or BTS), not the MS, even though the GANC believes the data to be associated with the MS.

Since in the approach illustrated in FIGS. 8D and 8E the AGW (and/or BTS, as applicable) are valid and known to the core network, computations normally required to be performed by the MS are able to be performed by the AGW (or BTS as applicable) to the satisfaction of the core network, with the result that the GANC allows the secure tunnel from the AGW to the GANC to be established by the AGW on behalf of the MS, which is the entity that the GANC believes has authenticated itself to the core network. The GANC believes the tunnel has been established based on the MS's credentials, which is what the AGW provided to the GANC and the GANC believes was provided by it to the core network (AAA server/proxy), but instead the AGW itself (or the BTS, in an applicable embodiment) has used its own EIM or other smart card to perform the computations required to provide to the core network via the GANC the authentication data required to establish the tunnel. Specifically, the AGW performs using its own EIM or other smart card (1) computations to verify authentication data provided by the network to authenticate the network elements to the MS, and (2) computations required to respond to challenges from the network to authenticate the MS, because the network provides its authentication data and computes expected responses from (in this case from the AGW on behalf of) the MS using a secret key associated with the NAI it received, which by virtue of the NAI translation described above is the NAI of the AGW (or the BTS), not the MS.

Figure 9:
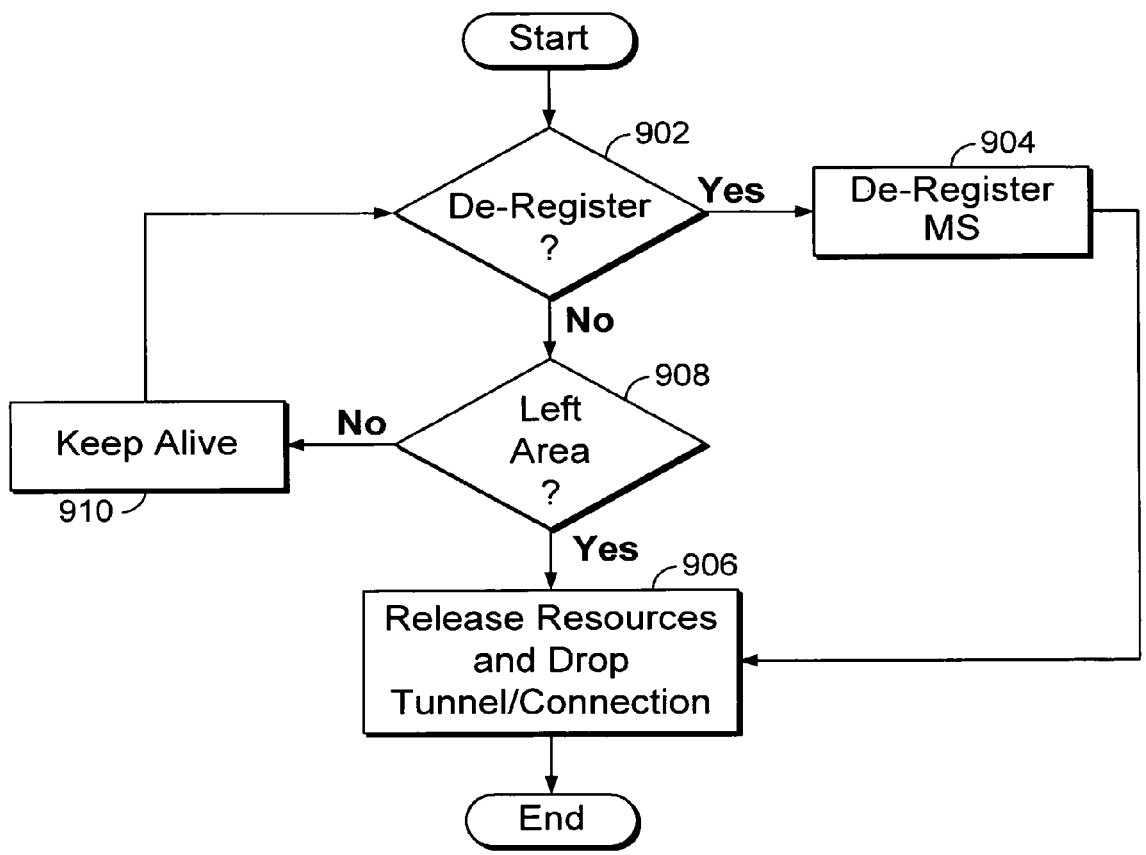
FIG. 9 is a flow chart illustrating an embodiment of a process for releasing resources associated with a standard cellular handset that has been accessing a mobile network via a generic access network.

FIG. 9 is a flow chart illustrating an embodiment of a process for releasing resources associated with a standard cellular handset that has been accessing a mobile network via a generic access network. In some embodiments, the process of FIG. 9 is implemented by an AGW. If an affirmative indication is received from the MS that it desired to de-register (902), the MS is de-registered (904) and associated radio and generic access network resources and connections are released (906). Radio and generic access network resources and connections associated with an MS likewise are released (906) if an MS is determined to have left a service/coverage area of a servicing micro-BTS associated with generic access network access to the mobile network (908). Otherwise, a connection associated with an MS is kept alive (910) until either the MS de-registers (902) or leaves the service area (910). In some embodiments, 910 includes sending on behalf of the MS, e.g., from the AGW to the GANC, if required and/or applicable, "keep alive" messages or indications normally sent and/or required to be sent by the MS to the GANC via the Up interface.

Figure 10:
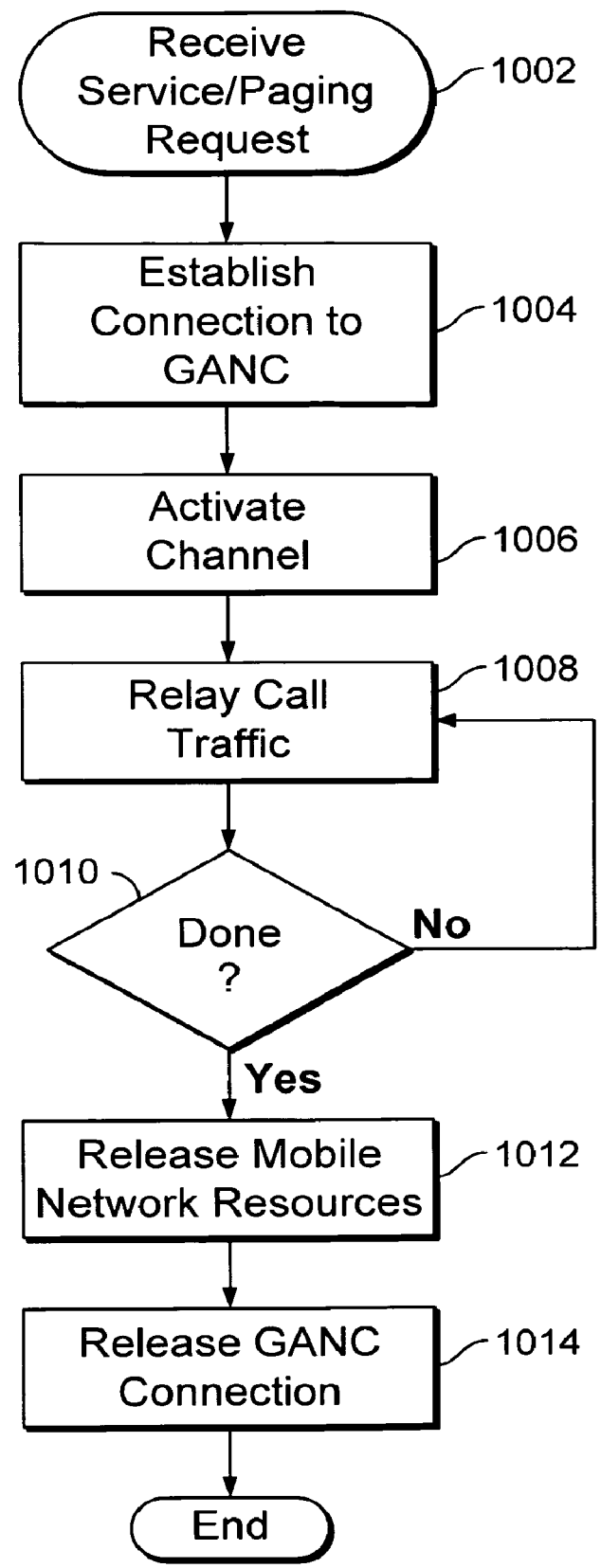
FIG. 10 is a flow chart illustrating an embodiment of a process for connecting a call placed by or to a standard cellular handset accessing a mobile network via a generic access network.

FIG. 10 is a flow chart illustrating an embodiment of a process for connecting a call placed by or to a standard cellular handset accessing a mobile network via a generic access network. In some embodiments, the process of FIG. 10 is implemented by an AGW. A service request (in the case of a call placed by the MS accessing the mobile network via a GAN) or a paging request (in the case of a call placed to the MS) is received (1002). A connection to the GANC is established on behalf of the MS, if not already established (1004). A channel associated with the MS is activated (1006). Voice (or other) data traffic associated with the call is relayed, e.g., to the MS via the micro-BTS in the case of outbound data received from the GANC, and to the GANC in the case of data received from the MS via the micro-BTS (1008). When the call is finished (1010), associated mobile network resources (1012) and the connection established by the AGW to the GANC on behalf of the MS (1014) are released, after which the process of FIG. 10 ends.

Figure 11A:
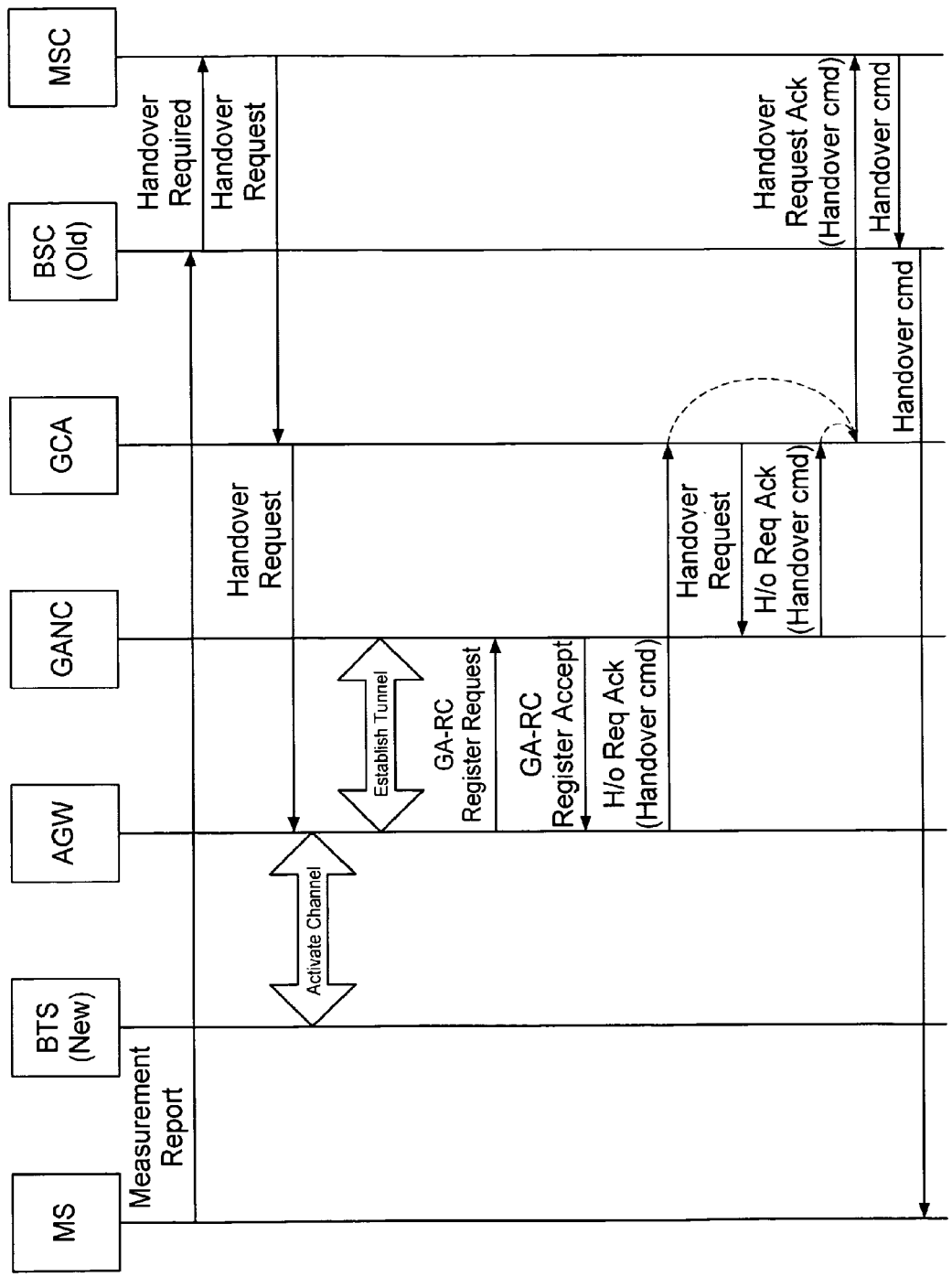
FIGS. 11A and 11B show a call flow diagram illustrating an embodiment of a process for handover to a BTS configured to enable a standard cellular handset to be used to access a mobile network via a GAN.
Figure 11B:
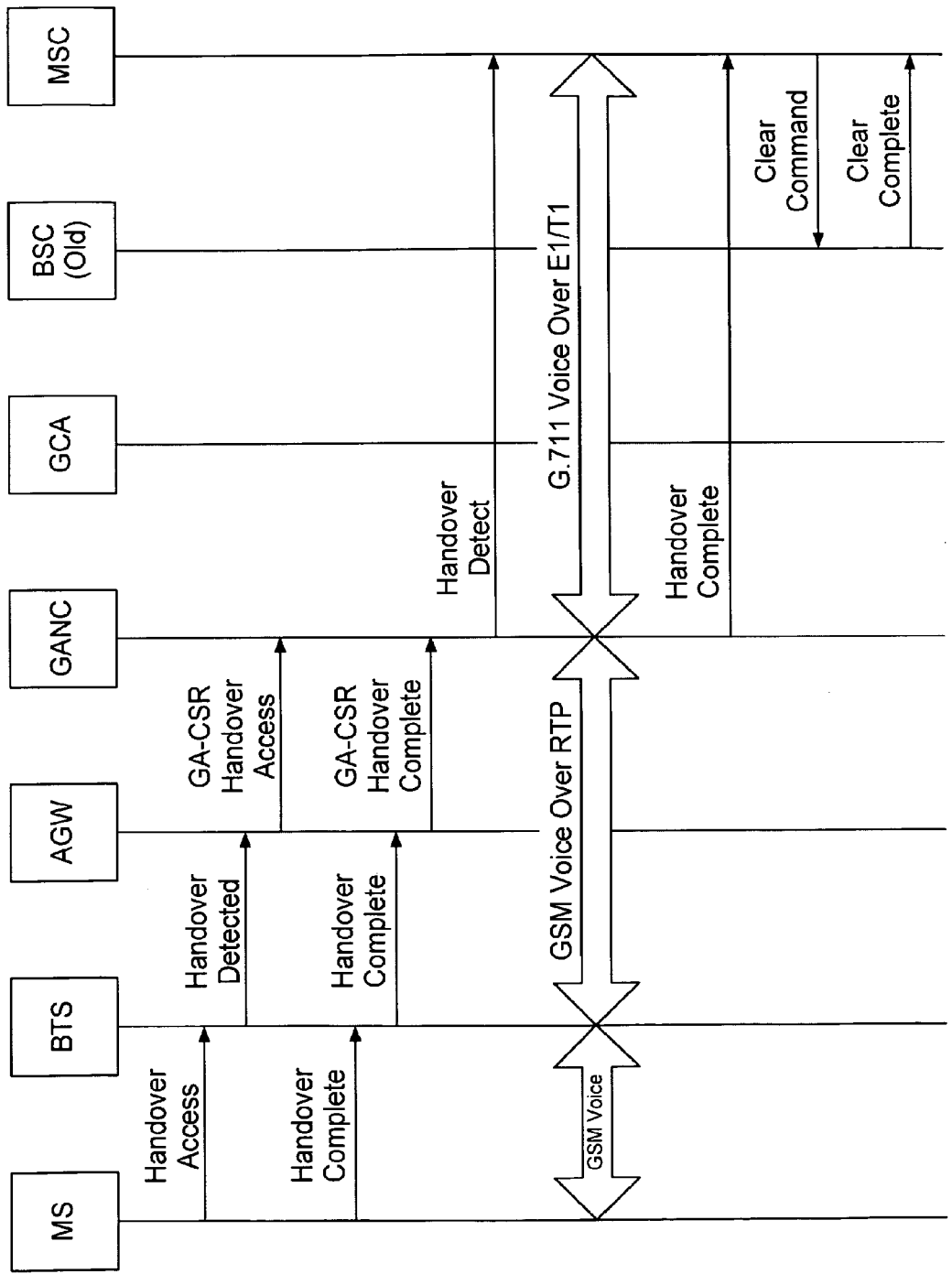

FIGS. 11A and 11B show a call flow diagram illustrating an embodiment of a process for handover to a BTS configured to enable a standard cellular handset to be used to access a mobile network via a GAN. In some embodiments, the process of FIG. 11A is implemented as applicable by a GANC adjunct, such as GCA 538 of FIG. 5 or GCA 610 of FIG. 6, and/or an AGW, such as AGW 532 of FIG. 5 or AGW 606 of FIG. 6. In some embodiments, the GANC adjunct is provided to compensate for the fact that the GANC is designed to connect not to a BTS, such as a micro BTS as described above, but instead to a wireless access point (AP). In a GSM network, under certain circumstances, such as handover, the MSC sends to the BSC certain messages required to be acted on by the BSC and/or a BTS downstream of the BSC; but the GANC ignores some of these messages, or processes them differently than a BSC would. In some cases, such as handover, one problem or difference between a GSM phone accessing the core mobile network via a GANC as described herein and a GSM phone in a normal GSM network the GSM phone does not establish a channel until after a handover has been initiated, whereas in a GAN the dual mode phone typically establishes a secure tunnel to the GANC before a handover is initiated. When a regular (not dual mode) GSM phone is used, as described herein, to communicate via a GAN, the GSM phone is not configured to establish such a secure tunnel to the GANC, and prior to a handover being initiated the AGW does not have the information, such as IMSI or equivalent of the GSM phone, needed to establish a tunnel on behalf of the GSM phone (or other mobile station). Therefore, absent the GANC adjunct, in some embodiments the GANC would receive handover messages from the MSC and not process them because the indicated MS would not yet have established (or the AGW would not yet have established on its behalf) a secure connection to the GANC.

In some embodiments, the GANC adjunct bypasses the GANC and passes messages between the MSC and the AGW, and in some cases performs or simulates processing normally done in a GSM network by the BSC, to facilitate handover to a micro BTS connected to the core mobile network via a GANC.

Referring to FIGS. 11A and 11B, a mobile station (MS) periodically sends measurement reports to a servicing BSC (designated "old BSC") in the example shown in FIGS. 11A and 11B. Based on the measurement reports, the servicing BSC determines that a handover is required, e.g., because the beacon or other signal from an adjacent cell is stronger (and/or increasing in strength) as reported by the MS than a corresponding signal from a cell currently servicing the MS, and generates a "handover required" message to the MSC. In the example shown, the MSC has determined the MS should be handed over to a micro BTS connected to the core mobile network via a GANC. The MSC sends via the GCA a "handover request" message intended for the GANC. The GCA intercepts the "handover request" message from the MSC and generates and sends to the AGW, via a direct interface that bypasses the GANC, a "handover request" message. In response to the handover request message received directly from the GCA, via the bypass interface, the AGW initiates and completes a channel activation procedure that results in a GSM channel being activated to enable the MS to communicate via the "new" (in this case micro) BTS to which the MS is being handed over. In addition, the AGW establishes on behalf of the MS (if not already present) a secure tunnel between the AGW and the GANC, which tunnel the GANC associates not with the AGW but with the MS, as described above. The AGW then sends via the tunnel established on behalf of the MS a "GA-RC register request" message to which the GANC responds with a "GA-RC register accept" message. In the example shown, the AGW then sends directly to the GCA, bypassing the GANC, a "handover request acknowledge" message with an embedded "handover command" message. After receiving the preceding message, the GCA forwards to the GANC the "handover request" message received previously from the MSC. Using this approach, the GANC does not receive the "handover request" message until after a security tunnel has been established on behalf of the MS and the MS has registered with the GANC. The GANC responds with a "handover request acknowledge (handover command)" message. In the example shown, the GCA creates based on both the "handover request acknowledge (handover command)" message it received from the AGW and the "handover request acknowledge (handover command)" message it received from the GANC, and sends to the MSC, a new "handover request acknowledge" message with an embedded "handover command" message only after the GCA has received both the "handover request acknowledge (handover command)" message directly from the AGW, via the direct interface between the AGW and the GCA, and the "handover request acknowledge (handover command)" message from the GANC, indicating that both the AGW and GANC are ready for the handover. The MSC then sends a "handover command" message to the "old" BSC, which in turn sends a "handover command" message to the MS. Referring now to FIG. 11B, the MS next sends a "handover access" message to the "new" (in this case micro) BTS, which in turn sends a "handover detected" message to the AGW. The AGW then sends a "GA-CSR handover access" message to the GANC. The MS next sends a "handover complete" message to the new (micro) BTS, which forwards the "handover complete" message to the AGW, which in turn translates the message into a "GA-CSR handover complete" message sent to the GANC. In response, the GANC sends a "handover detect" message to the MSC. From that point, the voice path is switched on. In the example shown, voice traffic is carried between the MS and BTS in the normal manner for a GSM phone (or other MS), between the BTS and the AGW as GSM voice over RTP, as described above, and between the GANC and MSC as G.711 voice over E1/T1, as is normal for GAN access to a core mobile network. After the voice path has been established, the GCA sends a "handover complete" message to the MSC and the MSC releases the "old" channel formerly being used by the MS by sending to the "old" BSC a "clear command" message, which the BSC acknowledges with a "clear complete" message to the MSC.

The combination of the handover messaging provided by and required to be provided to the GANC, based on the GAN access model and specifications, and the standard GSM messaging, facilitated as required by the GCA using the Ag interface, in some embodiments enables the AGW to present to the micro-BTS a view of the core network, with respect to handover processing, that is the same as or in relevant respects sufficiently similar to the view that the micro-BTS or another BTS would see if connected via a traditional (dedicated/private) connection directly to a BSC (e.g., via the Abis interface). In some embodiments, the messaging exchanged directly between the AGW and the GCA, e.g., via the Ag interface described above, is required at least in part due to the fact that in the GAN model, a mobile station (MS) typically has established a secure connection to the GANC prior to a handover being initiated, whereas in the GSM world an MS does not establish a channel enabling it to communicate with a BTS to which it is being handed off until after handover has been initiated. Therefore, to conduct a handover for a GSM (versus dual mode) MS from a traditional/macro-BTS, for example, to a micro-BTS that has access to the core network via a GANC, the AGW must establish on behalf of the MS a secure connection to the GANC, associated with that MS, for example as described above, or the GANC will not know how to process the handover messages it receives from the core network with respect to the MS.

Figure 12:
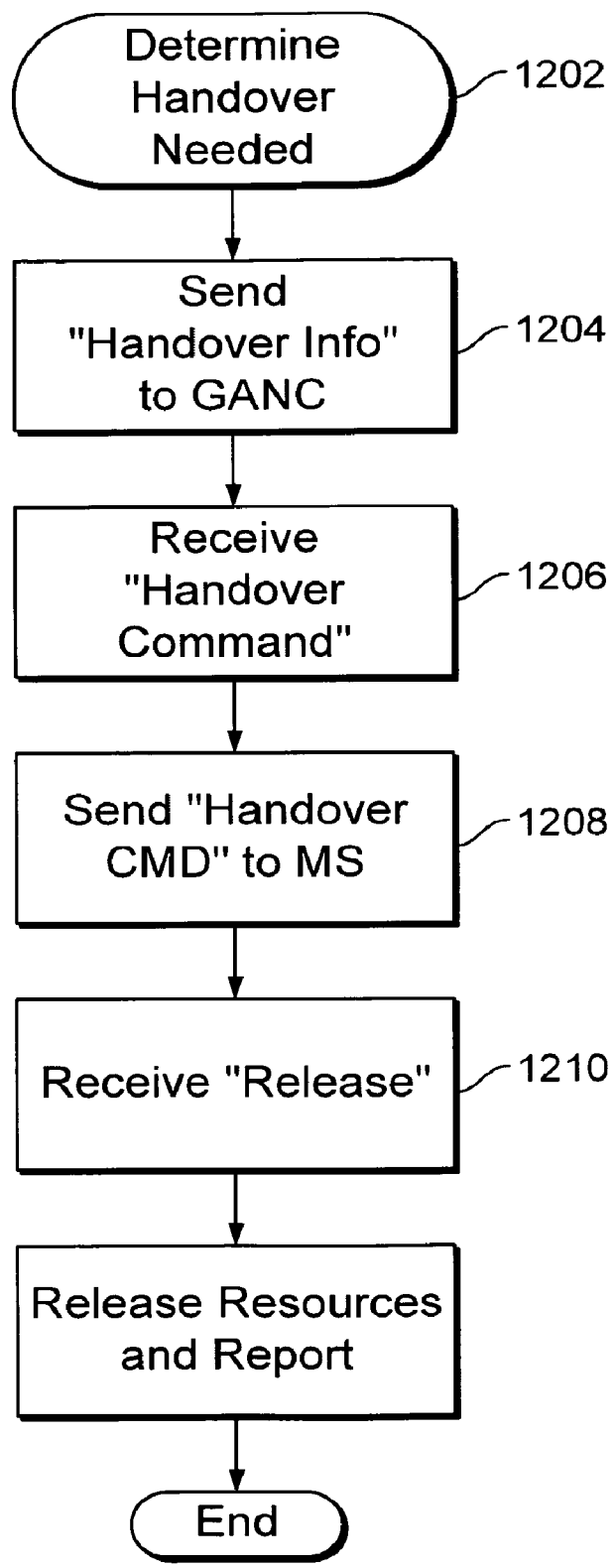
FIG. 12 is a flow chart illustrating an embodiment of a process for handover from a BTS configured to enable a standard cellular handset to be used to access a mobile network via a GAN.

FIG. 12 is a flow chart illustrating an embodiment of a process for handover from a BTS configured to enable a standard cellular handset to be used to access a mobile network via a GAN. In some embodiments, the process of FIG. 12 is implemented by an AGW. It is determined that a handover is required (1202), e.g., based on measurement data reported by the MS and/or uplink quality feedback received from the GANC. A "handover information" message is sent to the GANC (1204), which forwards the information to the MSC, which in turn uses the information to identify and configure a destination BSC (or GANC) to which to handover the call. A "handover command" message, sent by the GANC based on data received from the core mobile network in response to the handover information provided as described above, is received (1206). A "handover command" message is sent to the MS via the micro-BTS (1208), in response to which the MS communicates to the core network via the "new" BSC to which the MS has been told it is to be handed over its readiness to be handed over to the new BSC, which results in the GANC being notified by the core network that the MS is ready to be handed over. A "release" message is received from the GANC (1210). Resources associated with the MS and/or associated call are released and the release of such resources reported as applicable and/or required (1212), after which the process of FIG. 12 ends. In various embodiments, 1212 includes releasing a channel associated with the MS/call, reporting "release complete" to the GANC, and/or de-registering the MS with the GANC.

By enabling a standard cellular phone or other standard mobile station, such as a GSM phone, to be used to access a mobile network via a generic access network, the relatively low cost, ease of deployment and configuration, and flexibility of GAN access and associated hardware and/or software components can be used to provide access to mobile communication services at a cost that is lower to both the provider and the subscriber, who does not require a more expensive and complex dual mode phone.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A mobile network element, comprising:
   a communication interface; and
   a processor operatively coupled to the communication interface and configured to intercept a communication between a generic access network (GAN) element and a core mobile network, to generate a modified version of the communication, and to forward the modified version of the communication via the communication interface,
   wherein the mobile network element comprises a GAN adjunct (GCA), wherein a GAN controller (GANC) is communicatively disposed between an aggregation gateway (AGW) and the GCA, and
   wherein the GCA and the AGW have a bypass connection that bypasses the GANC, and
   wherein the bypass connection carries handover requests that are forwarded to the processor.

2. The mobile network element according to claim 1, wherein the network element is in communication with a cellular handset that is not configured to directly communicate with the GAN using an interface of the GAN.

3. The mobile network element according to claim 2, wherein the cellular handset is configured to enable a standard cellular air interface to interoperate with an "Up" interface.

4. The mobile network element according to claim 1, wherein multiple cellular handsets use one security tunnel in communicating with the AGW.

5. The mobile network element according to claim 4, wherein the AGW uses separate security tunnels corresponding to each of the multiple standard cellular handsets in communicating with the GANC.

6. The mobile network element according to claim 1, wherein the modified version of the communication comprises a modified data element comprising the communication.

7. The mobile network element according to claim 6, wherein the data element is modified based, at least in part, on a second communication received via an interface that bypasses the generic access network element.

8. The mobile network element according to claim 1, wherein the communication is from the generic access network element and is forwarded to the core mobile network.

9. The mobile network element according to claim 1, wherein the communication comprises a handover request acknowledge message from the generic access network element.

10. The mobile network element according to claim 1, wherein the modified version of the communication comprises a modified handover request acknowledge message.

11. The mobile network element according to claim 1, wherein the communication comprises a handover request acknowledge message.

12. The mobile network element according to claim 1, wherein the communication interface comprises an interface to a mobile switching center.

13. The mobile network element according to claim 12, wherein, at the mobile switching center, the interface to the mobile switching center is associated with the generic access network element.

14. The mobile network element according to claim 1, wherein the GAN element comprises the GANC and the mobile network element is located in a communication path between the GANC and the core mobile network.

15. A cellular communications system, comprising:
   an aggregation gateway (AGW);
   a generic access network controller (GANC) operatively coupled to the AGW; and
   a GAN adjunct (GCA) operatively coupled to the GANC, wherein the GCA is configured to intercept a communication between a GAN element and a core mobile network, to generate a modified version of the communication, and to forward the modified version of the communication via a communication interface,
   wherein the GANC is communicatively disposed between the AGW and the GCA,
   wherein the GCA and the AGW have a bypass connection that bypasses the GANC, and
   wherein the bypass connection carries handover requests.

16. A method for enabling a mobile station to be used to access a core mobile network via a generic access network, comprising:
   receiving an indication that a handover into a service area associated with the generic access network is to be performed;
   providing to a node on the mobile station side of a Generic Access Network (GAN) element located in a call data path between the mobile station and the core mobile network, via an interface that bypasses the GAN element, an attribute of the mobile station, the node being configured to use the attribute to establish, on behalf of the mobile station, a secure connection to the generic access network element, wherein the attribute is provided, at least in part, by intercepting and forwarding to the node, via the bypass interface, a handover request message sent by the core mobile network to the generic access network element.

17. The method according to claim 16, comprising:

communicatively disposing the GAN element between an aggregation gateway (AGW) and a mobile network element.

18. The method according to claim 16, comprising:
using, by multiple mobile stations, one security tunnel in communicating with the AGW.

19. The method according to claim 18, comprising:
using, by the AGW, separate security tunnels corresponding to each of the multiple mobile stations in communicating with the GANC.

20. The method according to claim 16, wherein the attribute comprises one or more of the following: an identifier associated with the mobile station, a network asset identifier (NAI) associated with the mobile station, and an international mobile subscriber identity (IMSI) associated with the mobile station.

* * * * *